(12) United States Patent
Mahmalat et al.

(10) Patent No.: US 10,735,628 B2
(45) Date of Patent: Aug. 4, 2020

(54) PIPELINE FOR HIGH DYNAMIC RANGE VIDEO CODING BASED ON LUMINANCE INDEPENDENT CHROMATICITY PREPROCESSING

(71) Applicant: Disney Enterprises, Inc., Burbank, CA (US)

(72) Inventors: Samir Mahmalat, Zurich (CH); Tunc Aydin, Zurich (CH); Aljosa Smolic, Dublin (IE)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/552,985

(22) Filed: Aug. 27, 2019

(65) Prior Publication Data

US 2020/0053252 A1 Feb. 13, 2020

Related U.S. Application Data

(62) Division of application No. 15/458,899, filed on Mar. 14, 2017, now Pat. No. 10,462,334.

(60) Provisional application No. 62/417,506, filed on Nov. 4, 2016.

(51) Int. Cl.
| | |
|---|---|
| *H04N 1/60* | (2006.01) |
| *H04N 1/64* | (2006.01) |
| *G06T 9/00* | (2006.01) |
| *H04N 19/85* | (2014.01) |
| *H04N 19/98* | (2014.01) |
| *H04N 19/186* | (2014.01) |

(52) U.S. Cl.
CPC ............. *H04N 1/6058* (2013.01); *G06T 9/00* (2013.01); *H04N 1/6005* (2013.01); *H04N 1/6008* (2013.01); *H04N 1/644* (2013.01); *H04N 19/186* (2014.11); *H04N 19/85* (2014.11); *H04N 19/98* (2014.11)

(58) Field of Classification Search
CPC .... H04N 1/6058; H04N 19/186; H04N 19/85; H04N 19/98; H04N 1/6005; H04N 1/6008; H04N 1/644; G06T 9/00
See application file for complete search history.

(56) References Cited

U.S. PATENT DOCUMENTS

| | | | |
|---|---|---|---|
| 2017/0026627 A1* | 1/2017 | Toma | .................... G09G 5/003 |
| 2018/0007372 A1 | 1/2018 | Lasserre | |
| 2018/0278965 A1* | 9/2018 | Dsouza | ................ H04N 19/124 |

OTHER PUBLICATIONS

Eman A. Al-Hilo, et al, "Comparison Fractal Color Image Compression using YIG and YUV Color Model", International Journal of Advanced Computer Science and Applications, vol. 6, No. 5, 2015. pp. 112-116. (Year: 2015).*

(Continued)

*Primary Examiner* — Chong Wu
(74) *Attorney, Agent, or Firm* — Artegis Law Group, LLP

(57) ABSTRACT

The disclosure describes a high dynamic range video coding pipeline that may reduce color artifacts and improve compression efficiency. The disclosed pipeline separates the luminance component from the chrominance components of an input signal (e.g., an RGB source video) and applies a scaling of the chrominance components before encoding, thereby reducing perceivable color artifacts while maintaining luminance quality.

20 Claims, 12 Drawing Sheets
(7 of 12 Drawing Sheet(s) Filed in Color)

(56) References Cited

OTHER PUBLICATIONS

Al-Hilo, Eman A. et al., "Comparison Fractal Color Image Compression Using YIQ and YUV Color Mode;," International Journal of Advanced Computer Science and Applications, vol. 6, No. 5, 2015. pp. 112-116. (2015).

Fabman et al., "Coordinates for Instant Image Cloning," ACM Trans. Graph., Jul. 2009, pp. 1-9, 28(3):67.

Ford, Adrian, "Colour Space Conversions," Aug. 1998, pp. 1-31.

Simon, Klaus, "Farbe im Digitalen Publizerien," Springer, 2008, English abstract translation.

Luthra et al., "Draft Requirements and Explorations for HDR and WCG Content Distribution," International Organisation for Standardisation, Apr. 2014, pp. 1-22, Valencia, Spain.

Luthra et al., "Test Sequences and Anchor Generation for HDR and Wide Gamut Content Distribution," International Organisation for Standardisation, Jul. 2014, pp. 1-15, Sapporo, Japan.

Pedzisz, Maciej, "Beyond bt.709," SMPTE Motion Imaging Journal, 2014, pp. 1-8, 123:18-25.

Schubert, E. Fred, "Chapter 17: Colorimetry," <http://www.ecse.rpi.edu/~schubert/Light-Emitting-Diodes-dot-org/chap17/chap17.htm>, accessed Mar. 21, 2016, pp. 1-15.

Sullivan et al., "Overview of the High Efficiency Video Coding (HEVC) Standard." IEEE Transactions on Circuits and Systems for Video Technology, Dec. 12, 2012, pp. 1649-1668, 22(12).

Aydin et al., "Extending Quality Metrics to Full Luminance Range Images," Human Vision and Electronic Imaging XIII, Proceedings of SPIE, Jan. 2008, pp. 6806-6810.

Luthra et al., "Call for Evidence (CfE) for HDR and WCG Video Coding," Geneva, Switzerland: ISO/IEC JTC1/SC29/WG11, Feb. 2015, pp. 1-46.

"Test Results of Call for Evidence (CfE) for HDR and WCG Video Coding," Warsaw, Poland: ISO/IEC JTC1/SC29/WG11, Jun. 2015, pp. 1-25.

Mantiuk et al., "High Dynamic Range Image and Video Compression-Fidelity Matching Human Visual Performance," Proceedings of the International Conference on Image Processing, ICIP, Sep. 2007, pp. 9-12.

Mantiuk et al., "Display Adaptive Tone Mapping," ACM Trans. Graph., 27(3):1-68 (2008).

Miller et al., "Perceptual Signal Coding for More Efficient Usage of Bit Codes," SMPTE Motion Imaging Journal, 122(4):52-59 (2013).

Sikudova et al., "A Gamut Mapping Framework for Color-Accurate Reproduction of HDR Images," IEEE Computer Graphics and Applications, 2015, pp. 78-90.

\* cited by examiner

| | Rate 1 | | Rate 2 | | Rate 3 | | Rate 4 | |
|---|---|---|---|---|---|---|---|---|
| Chrominance | | | | | | | | |
| Market | 36.1% | 38.9% | 47.4% | 18.4% | 73.3% | 17.8% | 79.6% | 0.1% |
| Tibul | 65.9% | 0.8% | 62.8% | 17.7% | 72.7% | 11.4% | 64.4% | 2.2% |
| FireEater | 47.9% | 41.7% | 80.0% | 46.5% | 81.2% | 36.6% | 81.3% | 33.5% |
| Balloon | 39.3% | 20.9% | 37.8% | 20.7% | 40.9% | 36.4% | 38.1% | 28.6% |
| Luminance | | | | | | | | |
| Market | 13.9% | 27.8% | 23.9% | 20.0% | 28.9% | 31.1% | 31.8% | 31.8% |
| Tibul | 31.8% | 4.5% | 33.3% | 11.8% | 52.3% | 13.6% | 40.0% | 2.2% |
| FireEater | 20.8% | 22.0% | 36.4% | 20.8% | 24.4% | 36.8% | 51.3% | 8.1% |
| Balloon | 25.0% | 10.7% | 21.6% | 20.7% | 29.6% | 30.4% | 31.0% | 39.1% |

FIG. 11

PIPELINE FOR HIGH DYNAMIC RANGE VIDEO CODING BASED ON LUMINANCE INDEPENDENT CHROMATICITY PREPROCESSING

CROSS-REFERENCE TO RELATED APPLICATIONS

This application is a divisional of and claims the benefit of U.S. patent application Ser. No. 15/458,899 filed on Mar. 14, 2017, which claims the benefit of U.S. Provisional Patent Application No. 62/417,506 filed on Nov. 4, 2016, each of which is incorporated herein by reference in its entirety.

TECHNICAL FIELD

The present disclosure relates generally to video coding.

DESCRIPTION OF THE RELATED ART

Interest in distributing video or other visual content having high dynamic range (HDR) and wide color gamut (WCG) is growing due to its ability to provide a viewing experience that is more enhanced when compared to conventional standard dynamic range (SDR) and standard color gamut (SCG) content. Extended luminance range and color gamut of newer displays create new challenges for the distribution of video and image content. With great quality comes reduced usability of current methods to store, process and distribute video and image content. That is because the bitrates might be too high for current distribution channels.

Current encoding strategies are designed with a stronger focus on retaining luminance quality rather than chrominance quality, which is reasonable for standard dynamic range displays, which typically support content with brightness in the range of about 0.1 to 100 nits. However, with a wider luminance range, color artifacts are more likely to be perceivable.

BRIEF SUMMARY OF THE DISCLOSURE

Embodiments disclosed herein describe a high dynamic range video coding pipeline that may reduce color artifacts and improve compression efficiency. The disclosed pipeline separates the luminance component from the chrominance components of an input signal (e.g., an RGB source video) and applies a scaling of the chrominance components before encoding, thereby reducing perceivable color artifacts while maintaining luminance quality.

In one embodiment, a method includes: converting an additive color space image (e.g., a video frame) into a uniform color space image having chrominance components and a luminance component; scaling the chrominance components of the uniform color space image; quantizing the scaled chrominance components and the luminance component; and encoding the quantized chrominance components and the luminance component. In various implementations of this embodiment, the uniform color space image is a Yu'v' color space image, where Y is the luminance component, and where u' and v' are the chrominance components. The additive color space image may be a red-green-blue (RGB) color space image.

In implementations, scaling the chrominance components of the uniform color space image includes scaling a rectangular bounding box of the visual color gamut in a parameter space of the u' and v' components while maintaining the aspect ratio of the visual color gamut. In some implementations, the rectangular bounding box may be scaled by a factor between about 0.4 and about 1.6. In particular implementations, the rectangular bounding box is scaled by a factor of greater than 1. In other particular implementations, the rectangular bounding box is scaled by a factor of less than 1. In one particular implementation, scaling the rectangular bounding box includes: scaling the bounding box to the unity square $[0, 1]^2$; and downscaling the scaled bounding box.

In further implementations, the method may include applying an electro-optical transfer function to the luminance component before quantizing the luminance component. In yet further implementations, the method may include subsampling the quantized chrominance components before encoding the quantized chrominance components.

In a second embodiment, a method includes: receiving an input bitstream carrying an encoded image represented by a uniform color space model having chrominance components and a luminance component; decoding quantized chrominance and luminance components of the encoded image; inverse quantizing the quantized chrominance and luminance components; inverse scaling the inverse quantized chrominance components; and converting the image represented by a uniform color space model into an image represented by an additive color space model. In various implementations of this embodiment, the first color space model includes a Yu'v' color space model, where Y is the luminance component, and wherein u' and v' are the chrominance components; and the second color space model includes an RGB color space model.

In further implementations of the second embodiment, the method includes: after inverse scaling the inverse quantized chrominance components, applying a gamut mapping to the chrominance components to map any out of color gamut pixels back into a display gamut. In specific implementations, applying a gamut mapping comprises mapping RGB values smaller than 0 to 0 and RGB values larger than 1 to 1.

In additional implementations of the second embodiment, the method includes: upsampling the chrominance components before inverse quantizing the chrominance components; and applying an inverse electro-optical transfer function to the luminance component after inverse quantizing the luminance component.

In additional implementations, inverse scaling the inverse quantized chrominance components includes scaling a rectangular bounding box of a visual color gamut in a parameter space of the u' and v' components. In such implementations, the rectangular bounding box may be scaled by the inverse of a factor between about 0.4 and about 1.6.

In yet further implementations, the method of the second embodiment includes: after converting the image represented by a uniform color space model into an image represented by an additive color space model, displaying the image (e.g., video frame) on a display.

In yet further implementations of the second embodiment, the method includes: receiving a scaling parameter or factor with the input bitstream, where the chrominance components are inverse scaled based on the received scaling parameter.

As used herein, the term "about" is used to describe and account for small variations in a numerical parameter, for example, due to rounding of the numerical parameter. For example, in quantitative terms, the term "about" can refer to less than or equal to ±5%, less than or equal to ±2%, less than or equal to ±1%, less than or equal to ±0.5%, less than or equal to ±0.2%, less than or equal to ±0.1%, and less than or equal to ±0.05%. Moreover, where "about" is used herein in conjunction with a numerical parameter it is understood that the exact value of the numerical parameter is also contemplated and described. For example, the term "about 10" expressly contemplates, describes and includes exactly 10.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined by the claims and equivalents.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure, in accordance with one or more various embodiments, is described in detail with reference to the following figures. The figures are provided for purposes of illustration only and merely depict typical or example embodiments.

FIG. 11 is a table showing detailed results of a user study for the scaling pipeline disclosed herein.

The figures are not exhaustive and do not limit the present disclosure to the precise form disclosed.

DETAILED DESCRIPTION

As discussed above, footage in HDR and WCG contains more information than SDR, which necessitates more storage space or increased bitrate for distribution. Because the bitrate might be too high for certain distribution channels, there is a need for higher compression efficiency. In contrast to conventional, non-constant luminance video coding pipelines, various embodiments disclosed herein provide a constant luminance coding pipeline. The disclosed pipeline separates the luminance component from the chrominance components of an input signal (e.g., a source video) and applies a scaling of the chrominance components before encoding, thereby reducing perceivable color artifacts while maintaining luminance quality.

In contrast to the constant luminance pipeline described in U.S. patent application Ser. No. 14/862,027, which applies a geometric transform to chrominance components of an input image converted to a uniform color space, the pipeline disclosed herein relies on a considerably less complex scaling of the chrominance components to achieve similar results in chrominance quality of the compressed image. The scaling of the chrominance components, in various implementations, may be adjusted depending on the desired tradeoff between color quality and compression size.

Figure 1:
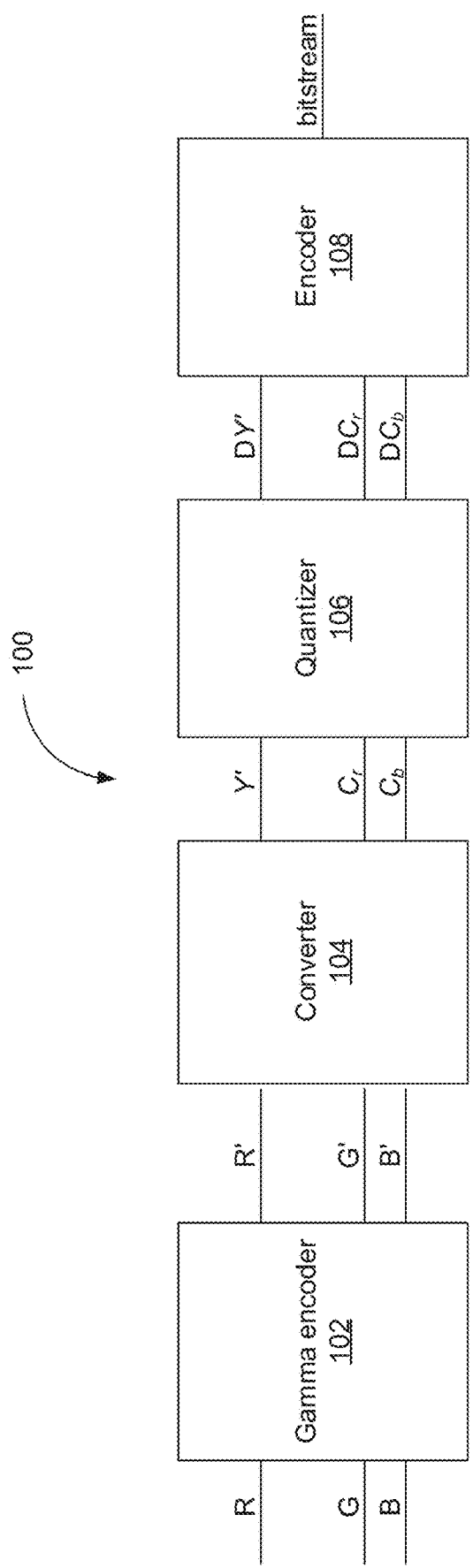
FIG. 1 is a schematic representation of a conventional non-constant luminance pipeline.

Before describing the pipeline disclosed herein in greater detail, it is instructive to describe the problems with current standards that are applied to HDR video coding. In this context, a call for evidence (CfE) for high dynamic range (HDR) and wide color gamut (WCG) video coding was issued recently by the Moving Picture Experts Group (MPEG), and technology proposals were tested. The aim of the CfE was to investigate whether current MPEG standards for standard dynamic range (SDR) video coding are feasible for HDR content as well. The current standards are designed for video content in the $Y'C_bC_r$ color format as described in ITU-R BT.601, ITUR BT.709, and ITU-R BT.2020. These standards rely on non-constant luminance coding. FIG. 1 illustrates an example conventional coding pipeline 100 in accordance with these standards to provide an appreciation for the differences between the prior art and the various embodiments disclosed herein.

Conventional coding pipeline 100 takes a video frame in RGB color space as input. Since each frame of the input video sequence must be processed individually, each step in the reference pipeline is applied to each frame in sequence. The input (RGB) image is first converted to double precision within the range [0,1]. Thus, a nonlinear transfer function (TF) is applied by gamma encoder 102 which redistributes the linear luminance of the R, G, and B channels or components to other code levels and results in nonlinear RGB components, denoted by R', G', and B'. It can be appreciated that small changes of luminance in lower intensities are perceived much better than in the high intensities. In addition, at least some of the subsequent processes in conventional coding pipeline 100 will be lossy, and there are a limited number of bits for storage. The TF preserves valuable information in the lower intensities by using a larger part of the bit space for these low values. If certain noticeable coding errors of an image were introduced in RGB, viewers would perceive them much more in the lower intensities than in the higher ones. If these errors were in the R'G'B' domain instead, they would be equally noticeable in all intensities once the image is converted back to RGB. Thus, the values for the lower intensities are expanded, while the values for the higher intensities are compressed together.

Converter 104 converts the R'G'B' components into the $Y'C_bC_r$ color space in accordance with the BT.2020 specification. The $Y'C_bC_r$ color space represents a non-constant luminance (luma) component, Y', and the blue-difference, $C_b$, and the red-difference, $C_r$, chroma components. Quantizer 106 acts to quantize the Y', $C_r$, and $C_b$ components, represented by CY', $DC_r$, and $DC_b$. Encoder 108 (e.g., applying the AVC/H.264 codec) encodes the quantized components to output an encoded bitstream that can be stored and/or transmitted as discussed previously.

In the conventional coding pipeline 100, luma component Y' is representative of light intensity that is nonlinearly encoded based on gamma corrected RGB primaries. Coding errors introduced in luma can leak into the chrominance and lead to deviations that are observable not only in brightness but also in the colors rendered by a display. While this non-constant luminance coding pipeline is designed for coding SDR signals (e.g., RGB up to 100 nits in the BT.709 color space), it has also been repurposed for encoding HDR and WCG signals (e.g., RGB up to 10000 nits in the BT.2020 color space). However, this conventional coding pipeline still remains ill-designed as it continues to apply non-constant coding of luminance. While encoding SDR content in $Y'C_bC_r$ color format may provide sufficient quality, employing this color format for HDR coding leads to an increase of perceivable color artifacts, in particular for stronger compression.

Embodiments disclosed herein address these problems for HDR coding while maintaining full compatibility to standard video coding (e.g., HEVC), i.e., without modifying the core encoder but rather by adapting the coding pipeline. In this manner existing hardware and software designs of the core codec may be used with minimal or no change.

Figure 2:
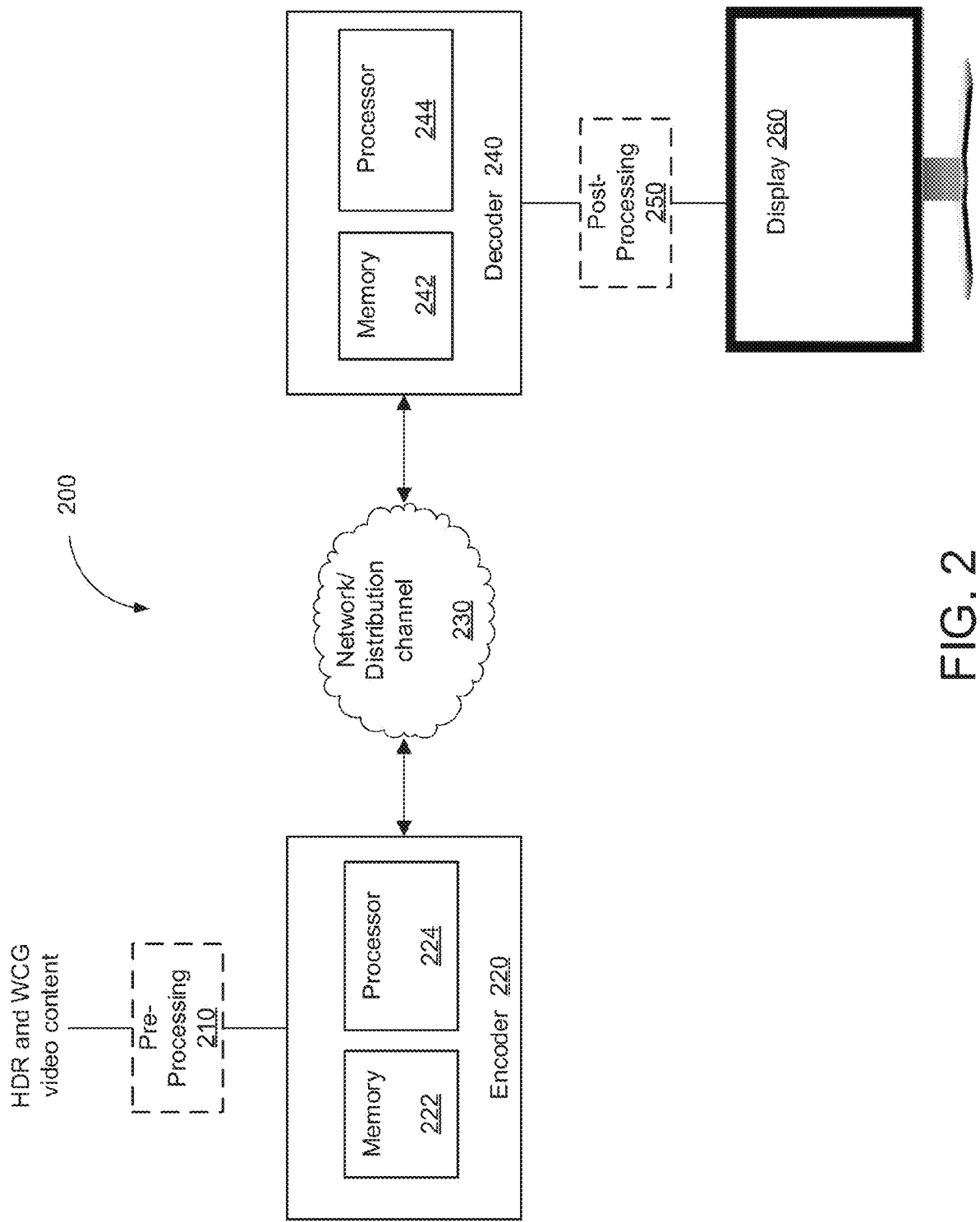
FIG. 2 illustrates an example video processing system in which various embodiments may be implemented to provide a constant luminance coding pipeline with chromaticity scaling.

FIG. 2 illustrates an example system 200 in which various embodiments may be implemented to provide a constant luminance coding pipeline with chromaticity scaling. System 200 can include encoder 220, decoder 240, and a network or distribution channel(s) 230 to which both decoder 240 and encoder 220 may be connected. Encoder 220 may include a memory 222 and a processor 224, while decoder 240 may also include a memory 242 and a processor 244. Decoder 240 may be part of a set-top box, television tuner, Blu-ray player, etc.

In operation, processor 224 of encoder 220 may execute computer instructions that are stored in memory 222, such as computer instructions for encoding a video sequence. That is, video content, which can be in the HDR or WCG format, is received by encoder 220 and then compressed in preparation for storage and/or transmission. For example, processor 224 of encoder 220 may execute a process to encode a video sequence using, for example, the High Efficiency Video Coding (HEVC) codec. The encoded video sequence may be transmitted to decoder 240 over a network 230 (e.g., a satellite network, a cable network, a cellular network, etc.) Alternatively, the encoded video sequence may be stored on a physical medium (e.g., a Blu-ray disc) and physically distributed to a user of a device (e.g., a Blu-ray player) including decoder 240.

Decoder 240, which may be implemented in some type of receiving device (e.g., set-top box, television tuner, Blu-ray player, smart TV, laptop, etc.), may receive the encoded HDR or WCG video sequence for decoding and presentation to display 260. That is, processor 244 of decoder 240 may execute computer instructions that are stored in memory 242, such as computer instructions for decoding the received HEVC coded video sequence.

System 200 also includes pre-processing and post-processing portions 210 and 250, respectively, in which one or more coding or decoding algorithms, in accordance with various embodiments, are implemented. It should be noted that although system 200 illustrates pre-processing portion 210 separately from encoder 220 and post-processing portion 250 separately from decoder 240, in various embodiments pre-processing portion 210 and encoder 220 may be implemented in the same device. Similarly post-processing portion 250 and decoder 240 may be implemented in the same device.

Figure 3:
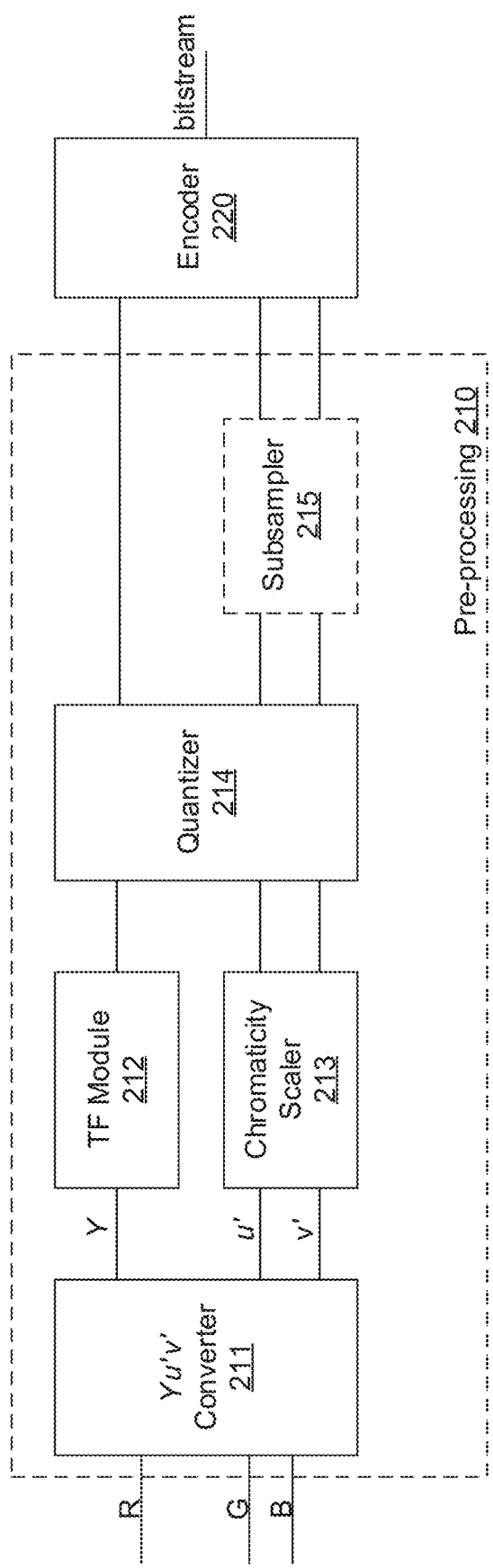
FIG. 3 is a schematic representation of a pre-processing portion 210 that may be utilized in the video processing system of FIG. 2.

FIG. 3 is a schematic representation of a pre-processing portion 210 that may be utilized in video processing system 200. Pre-processing portion 210 includes a Yu'v' converter 211, a transfer function (TF) module 212, a chromaticity scaler 213, a quantizer 214, and an optional subsampler 215. The components of pre-processing portion 210 may be separate hardware and/or software components or functional aspects of the same hardware/software component.

As shown, pre-processing portion 210 takes as an input an image or video frame in additive color space (e.g., an RGB video signal), converts the signal to a uniform color space having a luminance component separate from its chrominance components (e.g., Yu'v' color space), scales the chrominance components of the uniform color space signal, and outputs a quantized signal to encoder 220. Encoder 220 then encodes the quantized signal to output an encoded bitstream. In the case of video, each frame of the input video may be processed individually, with each step in pre-processing portion 210 applied to each frame in sequence.

Figure 4:
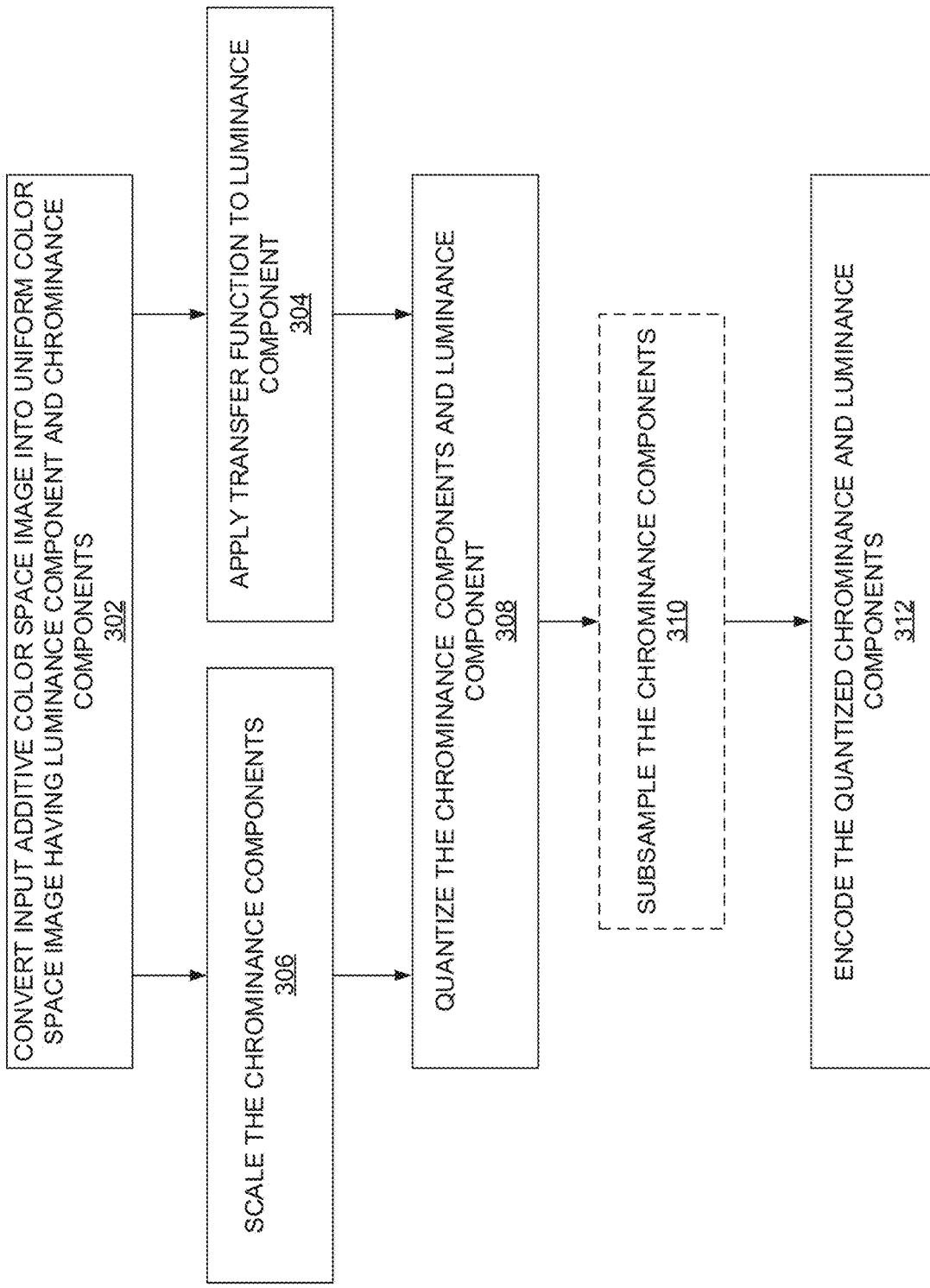
FIG. 4 is an operational flow diagram illustrating example operations that can be performed by the pre-processing portion of FIG. 3 to achieve constant luminance coding with dedicated chromaticity scaling of video content in accordance with various embodiments.

FIG. 4 is an operational flow diagram illustrating example operations that can be performed by pre-processing portion 210 to achieve constant luminance coding with dedicated chromaticity scaling of video content in accordance with various embodiments. At operation 302, Converter 211 converts an input additive color space image (e.g., a video frame or standalone image) into a uniform color space image having chrominance components or channels separate from the luminance component or channel. As illustrated by FIG. 3, the red, green, blue (RGB) color space is an additive color space that may be used by the input image. The RGB color space can be understood as adding red, green, and blue light together to arrive at a plurality of other colors. The RGB color space may be used for the sensing, representation, and display of images in electronic systems, such as monitors, TVs, etc. Input devices, such as video cameras, image scanners, video game consoles, digital cameras and the like may input an RGB signal into an output device, such as a TV, monitor, projector, or other display.

The uniform color space may be referred to as a Yu'v', CIELUV, or CIE 1976 color space (where CIE is the International Commission on Illumination) that is used in a color image pipeline. Y refers to a constant luminance component and u' and v' refer to the chrominance components of the CIE 1976 u'-v' diagram illustrated by FIG. 5, which includes gamut boundaries of RGB gamuts with primaries as defined in BT.2020 (solid lines) and BT.709 (dashed lines). In contrast with the conventional pipeline of FIG. 1 that converts an input RGB signal to the Y'C$_b$C$_r$ color space, the conversion to the Yu'v' color space at operation 302 separates the luminance component of the image from the chrominance component, which allows individual treatment of luminance and chrominance. Any quantization and coding errors introduced to the luminance component, Y, have an impact only on the luminance Y. In particular, leaking of compression errors into chrominance does not occur. Additionally, Yu'v' is a roughly perceptual uniform color space, thereby making the perceptibility of quantization errors more predictable and controllable.

It should be noted that as described above, the conversion from the RGB color space to the Yu'v' color space can be performed "directly" from RGB to Yu'v' components or channels. However, in accordance with other embodiments, an intermediate conversion (not shown) can be performed to convert the RGB components or channels into an XYZ color space, where XYZ components may then be subsequently converted into the above-noted Yu'v' components.

Example methods of converting from an RGB color space to a Yu'v' color space are further described in U.S. patent application Ser. No. 14/862,027, filed Sep. 22, 2015, which is incorporated herein by reference.

At operation 304, a luminance-specific EOTF (e.g., a PQTF) may be applied to the luminance component Y by TF Module 212 without influencing the chrominance components. While the conventional MPEG pipeline 100 uses an electro-optical transfer function (EOTF), e.g., the perceptual quantizer transfer function (PQTF), despite its design for contrast sensitivity, it is not applied to the luminance but rather to the input signal, i.e., the individual RGB components. By separating the luminance from the chrominance, embodiments disclosed herein permit application of the EOTF directly to the luminance without having any influence on the chrominance. As further described below, this separate treatment of the luminance and chrominance components further aids in making compression more efficient.

Figure 5:
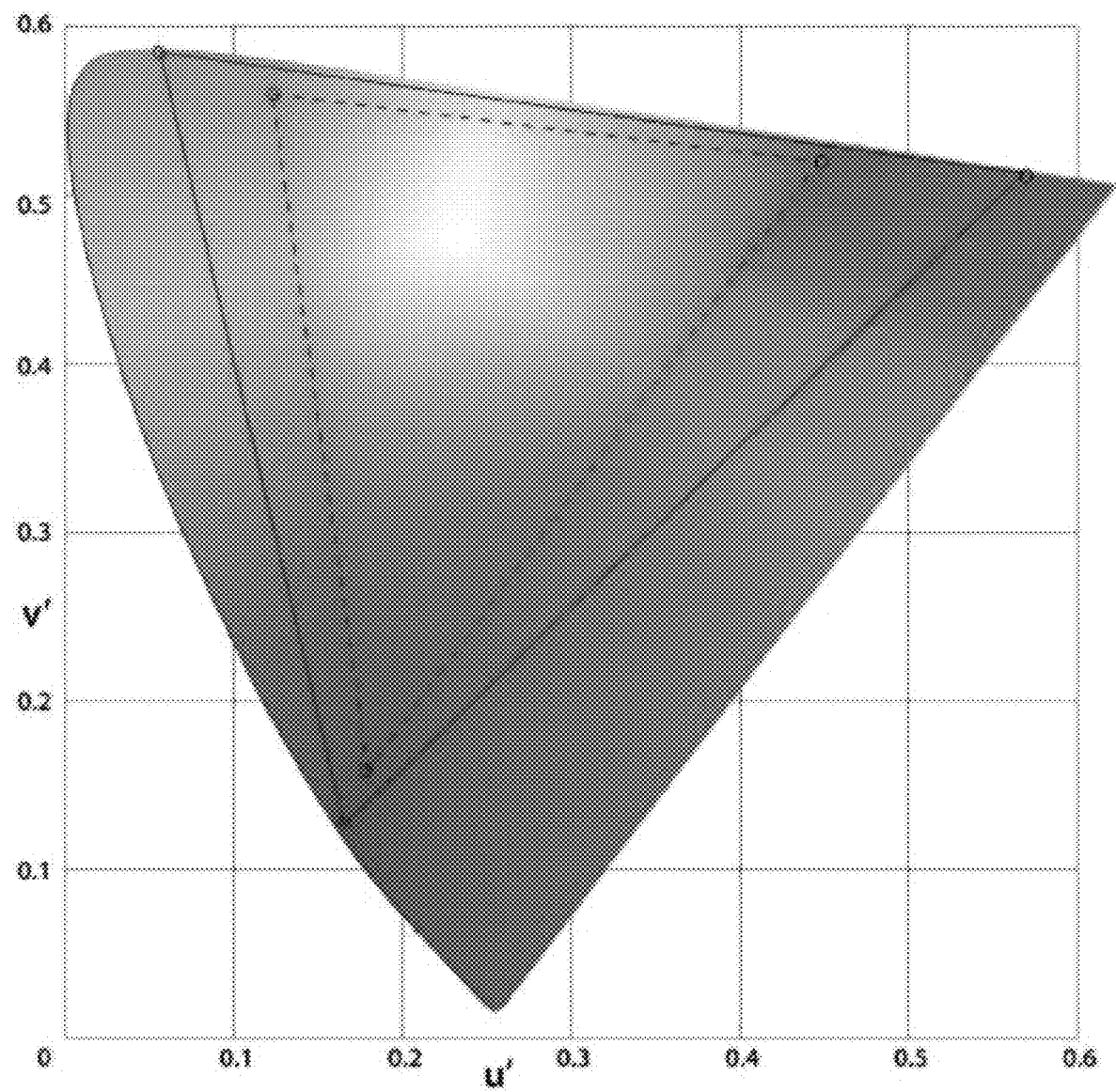
FIG. 5 shows the CIE 1976 u'-v' diagram and the according boundaries of the RGB color gamuts with primaries as defined in BT.2020 and BT.709, the boundaries forming a triangle in the u'-v' plane that contains visible colors.

As illustrated by FIG. 5, which shows the CIE 1976 u'-v' diagram and the according boundaries of the RGB color gamuts with primaries as defined in BT.2020 and BT.709, the boundaries form a triangle in the u'-v' plane that contains visible colors in roughly the [0, 0.6]$^2$ parameter space. However, encoding in the u'-v' color space allows for the representation of many (u', v') value pairs outside of the RGB triangle, where each pair can be defined as a chrominance value of a pixel. In particular, for the u' and v' components, the visual colors do not fill the complete [0, 1]$^2$ parameter space that is used by future operations of the pipeline such as quantization. In the case of the BT.2020 triangle, roughly 11% of the unity square [0, 1]$^2$ is filled, i.e., roughly 11% of the possible chrominance values correspond to colors that lie inside the BT.2020 color gamut. If the u'-v' coordinates of the triangular color gamut are used like this during quantization, a uniform quantization of the whole parameter space leads to an information loss as compared to chrominance values that fill the entire parameter space.

To reduce this information loss, at operation 306, the u' and v' chrominance components may be scaled by chromaticity scaler 213. In particular, the rectangular bounding box of the entire visual color gamut in the u'-v' plane may be scaled while maintaining the aspect ratio. As such, the number of (u', v') pairs, where each pair can be defined as a chrominance value of a pixel, may be increased or decreased depending on the requirements of the content being compressed.

In one embodiment, the rectangular bounding box of the entire visual color gamut in the u'-v' plane may be scaled to the unity square [0, 1]$^2$ while preserving the aspect ratio. For example, the area of the entire visual color gamut as illustrated in FIG. 5 may be scaled such that its area in the unity square is maximal without changing its aspect ratio. This may be achieved by scaling the rectangular bounding box of the entire visual color gamut in the u'-v' plane by a factor s' of about 1.6. Thereafter, the scaled result may then be downscaled by a factor of s$^{-1}$ where s∈P,s≥1, and where s=1 means maximum quality and s>1 applies an actual downscaling, thereby impairing the color quality. This embodiment may be expressed as Equation (1):

$$(u_{final}, v_{final}) = (u', v') * s' * s^{-1} \quad (1)$$

Where each (u', v') pair may be defined as an initial chrominance value of a pixel, (u$_{final}$, v$_{final}$) may be defined as a final chrominance value of a pixel, and where s'=1/max{x∈[0,1]|(x, y) is in the visible gamut for some y∈[0, 1]}.

In embodiments, s may be between 1 and 4 to maintain a balance between color and luminance quality.

In another embodiment, a single scaling operation may be applied directly to the rectangular bounding box of the entire visual color gamut in the u'-v' plane based on Equation (2):

$$s' = \frac{1.6}{s}, 0 \leq s' \leq 1.6, s \in P, s \geq 1 \quad (2)$$

As such, in embodiments, the rectangular bounding box of the entire visual color gamut in the u'-v' plane may be scaled by a factor of about 1.6 or less, where a factor of about 1.6 scales the bounding box to the unity square [0, 1]$^2$. In implementations where 1<s'≤1.6, color quality may be improved (as compared to no scaling) but at the expense of compression size (i.e., higher bitrate is required). Conversely, where s'<1, compression size may improve (i.e., lower bitrate is required) but at the expense of color quality. In implementations, the scaling factor s' may be automatically or manually adjusted depending on the requirements and attributes of the content being compressed. For example, a higher scaling factor s' may be selected where less compression is needed, where luminance quality is a lower priority than color quality, or for other reasons. Conversely, a lower scaling factor s' may be selected where greater compression is needed, where luminance quality is a higher priority than color quality, or for other reasons. In particular embodiments, 0.4≤s'≤1.6.

At operation 308, the luminance, Y, and chrominance components, u' and v', are quantized by quantizer 214. Quantization can refer to a lossy compression technique achieved by compressing a continuous range of values (e.g., floating point values), in this case, the luminance and chrominance component values, into quantum values (e.g. integer values), thereby reducing the number of colors utilized to represent an image. Depending on the desired quality of the image (e.g., 10-bit HDR content versus 12-bit HDR content), quantizer 214 may be an 8-bit quantizer, a 10-bit quantizer, a 12-bit quantizer, or a quantizer that uses more than 12 bits. Any number of quantization techniques can be used at operation 308.

As would be appreciated by one having skill in the art from the foregoing description, the amount of color information loss during quantization operation 308 will depend on the scaling applied during operation 306. Where the rectangular bounding box of the color gamut is scaled to the unit square $[0, 1]^2$, the least amount of information loss will occur as the most quantization steps will match valid values. As the rectangular bounding box of the color gamut is downscaled, information loss will increase with the decreasing size of the bounding box as fewer quantization steps match valid values.

At optional operation 310, the quantized chrominance components may be subsampled using subsampler 215. Given that the human eye is less sensitive to color than it is to brightness, bandwidth can be saved without loss of perceived color quality by subsampling the color information (e.g., by reducing the resolution of the (u',v') channel). In implementations, the chrominance components may be subsampled by calculating intermediate pixel values to reduce the size of the resolution of the color channel (e.g., by 10%, by 20%, by 30%, by 40%, by 50%, or by even more). For example, color information in a resolution of 1920×1080 may be reduced to a resolution of 960×590.

The results of using pre-processing portion 210 to perform operations 302 through 310 on an input image is a pixel representation that may be suitable for high dynamic range image and video compression. It may represent the full visual gamut, which makes it input color space independent. It may be roughly perceptually uniform in color and luminance (assuming a proper EOTF is applied), making the perceptibility of quantization errors more predictable and controllable. Additionally, the luminance is independent of color, thereby allowing a separate treatment of color and luminance components/channels. An integer representation is advantageous for coding compared to floating point representations and lastly, a direct relation to CIE 1931 XYZ color space allows a quick color transformation from and to RGB and similar color spaces.

At operation 312, the quantized chrominance components and the quantized luminance component are encoded by encoder 220. Encoder 220 may have a memory unit having computer code configured to cause a processor to apply any video codec, such as the VP9 or HEVC codec. In the case of the HEVC codec, which is a successor to advanced video coding (AVC) also known as H.264, it should be noted that HEVC was originally designed for SDR and SCG content, and in conventional applications, is not optimal for coding HDR or WCG video sequences with regard to compression efficiency. However, the aforementioned scaling operation described in operation 306 converts the chrominance components into values that are more efficient for compression purposes (making better use of codewords at the (e.g., HEVC) codec level).

The encoded content and scaling parameter used at operation 306 may subsequently be transmitted to a receiver that decodes the content. For example, the scaling parameter may be transmitted with a bitstream that includes the encoded content.

Figure 6:
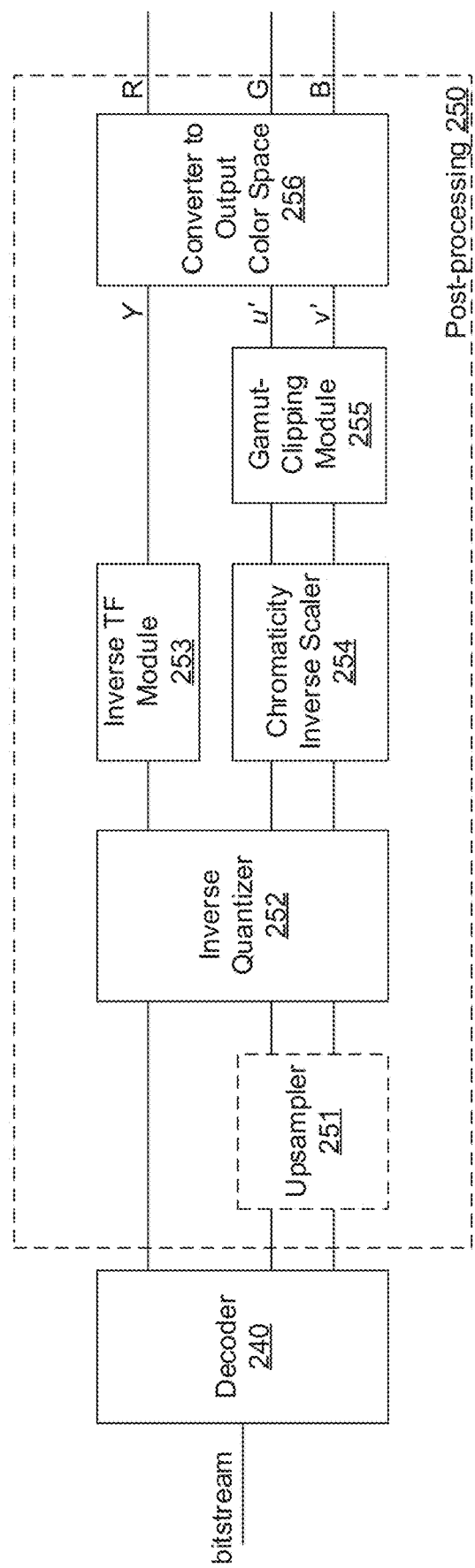
FIG. 6 is a schematic representation of a post-processing portion that may be utilized in the video processing system of FIG. 2.

FIG. 6 is a schematic representation of a post-processing portion 250 that may be utilized in video processing system 200 (e.g., by a receiver of encoded video content). Post-processing portion 250 includes an upsampler 251, inverse quantizer 252, inverse TF module 253, chromaticity inverse scaler 254, gamut-clipping module 255, and converter to output color space 256. The components of post-processing portion 250 may be separate hardware and/or software components or functional aspects of the same hardware/software component.

As shown in FIG. 6, decoder 240 decodes (e.g., using an HEVC codec) an encoded bitstream that was processed in accordance with FIG. 3, and outputs the luminance component and chrominance components of an image (e.g., video frame). In the case of video, each frame of the input video may be processed individually, with each step in post-processing portion 250 applied to each frame in sequence. The luminance and chrominance components are received as inputs to post-processing portion 250, which applies the inverse operations of pre-processing portion 210. In particular, post-processing portion 250 may upsample (if needed) the chrominance components using upsampler 251, inverse quantize (e.g., map integer values back to floating point values) the luminance and chrominance components using inverse quantizer 252, apply an inverse EOTF to the inverse quantized luminance component using inverse TF module 253, apply an inverse scaling to the inverse quantized chrominance components using chrominance inverse scaler 254, and convert the uniform color space image (e.g., Yu'v' color space) back into an additive color space image (e.g., RGB color space) using converter 256.

To invert the scaling (e.g., invert operation 306 of pre-processing portion 210), a scaling parameters may be transmitted to the receiver side as an additional, content dependent parameter. For example, the scaling parameter s may be transmitted with the encoded video content. Alternatively, in implementations where the same scaling parameters is always applied to the encoded video content, the scaling parameter s may be locally stored in the receiver side.

In addition to applying the inverse operations to pre-processing portion 210, post-processing portion 250 may, after scaling back the chrominance components, and before transforming to the output color space, apply a gamut mapping or gamut clipping to the chrominance components using gamut-clipping module 255. This gamut mapping step maps any out of color gamut pixels back into a display gamut (e.g., the visible RGB gamut, the RGB gamut with primaries as defined in BT.2020, or the RGB gamut with primaries as defined in BT.709). As noted above with reference to FIG. 5, the u'v' chrominance components do not fill the whole $[0, 1]^2$ parameter space, which means that there are valid parameter pairs $[0, 1]^2$ that do not correspond to colors in the input gamut or even visible colors. Hence, the errors introduced by quantization and encoding may result in colors that are outside the input gamut and might even be outside the visible gamut. This is illustrated in greater detail with reference to FIGS. 7 and 8.

Figure 7:
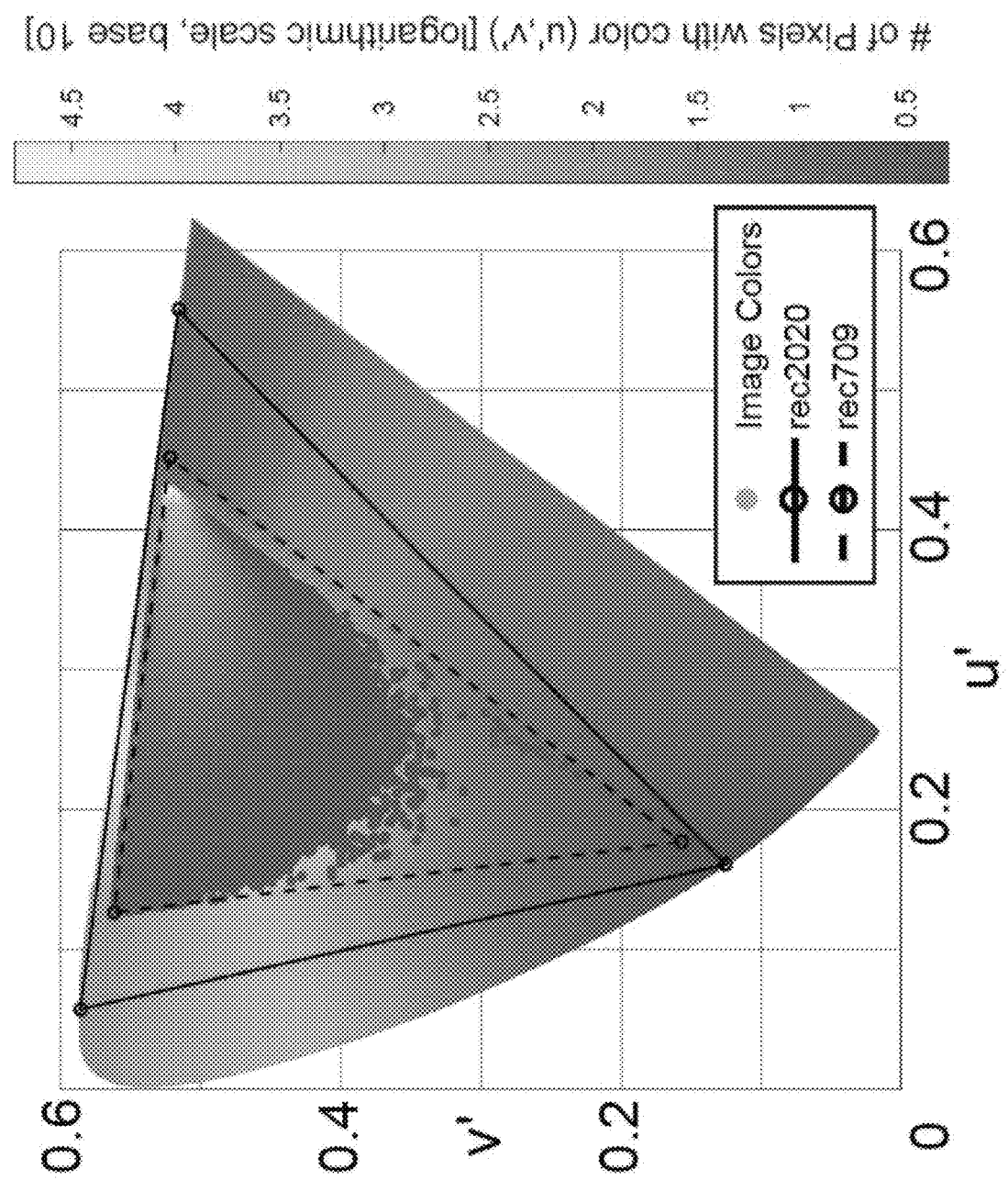
FIG. 7 shows a distribution of colors projected onto the u'-v' plane in an original frame of a video sequence before encoding.
Figure 8:
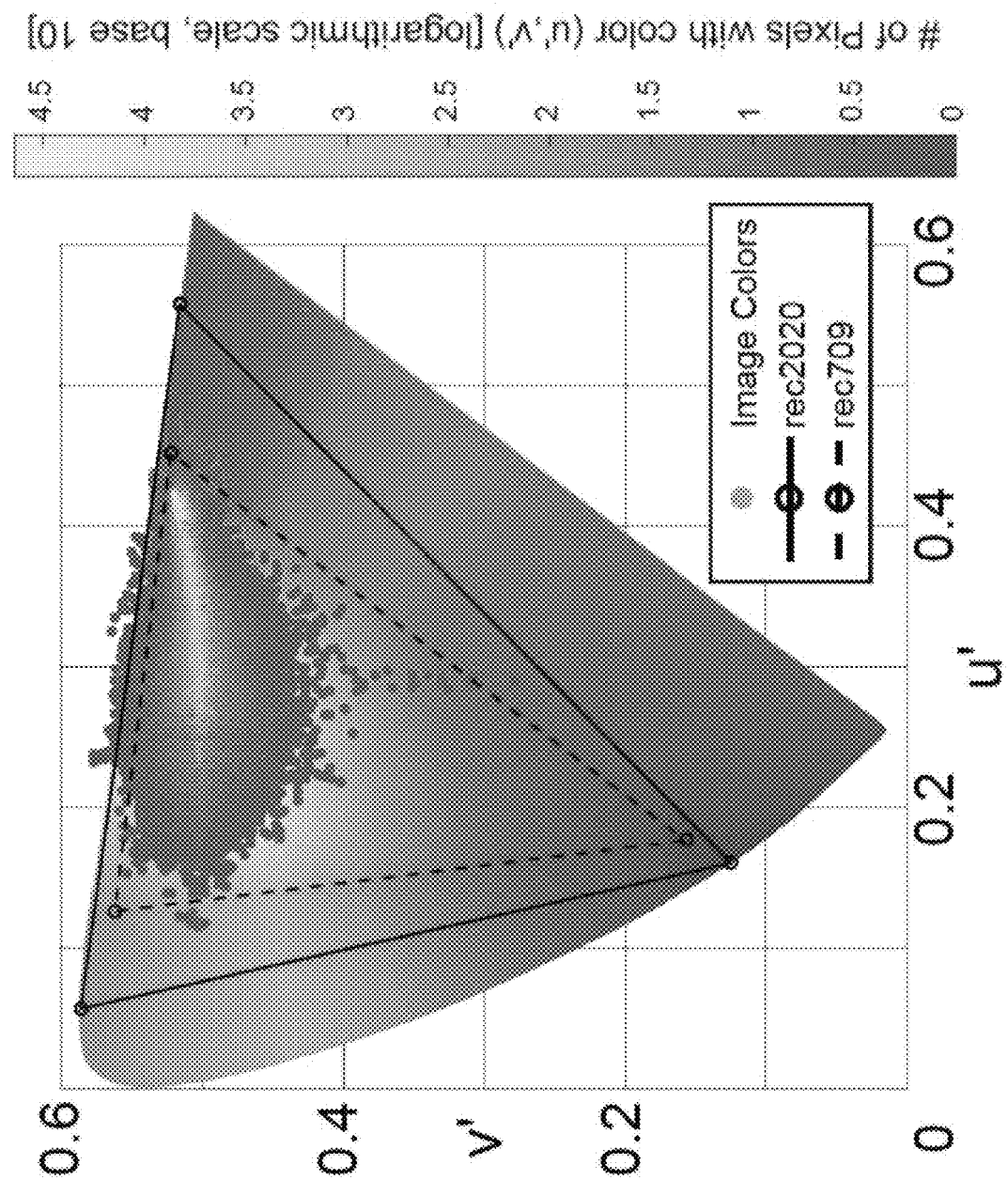
FIG. 8 shows the distribution of colors of the video frame of FIG. 7 after decoding, but before any gamut clipping is applied, using the scaling pipeline disclosed herein.

FIG. 7 shows a distribution of colors (histogram with 1024 bins per axis) projected onto the u'-v' plane in an original frame of a video sequence before encoding. FIG. 8 shows the distribution of colors of this video frame after decoding, but before any gamut clipping is applied, using the scaling pipeline disclosed herein with the following parameters: PQTF, 10-bit quantization, 4:2:0 downsampling, quantization parameter (QP)=31, s=2.8. As illustrated by FIG. 8, the color of several pixels is now outside of the BT.709 gamut and even outside the visible gamut. Thus, these pixels of the video frame should be remapped before being displayed.

In one embodiment, out-of-gamut pixels of an image may be clipped by mapping RGB values smaller than 0 to 0 and RGB values larger than 1 to 1. In other embodiments, other gamut clipping algorithms may be used to map out-of-gamut pixels of an image back into the display gamut. Thus, a dedicated clipping or mapping step may be used to map out-of-gamut colors back into a display gamut without artifacts.

EXPERIMENTAL RESULTS

The constant luminance with chromaticity scaling coding pipeline disclosed herein was compared to the pipeline used by MPEG in their CfE for HDR and WCG video coding, referred to herein as an anchor pipeline. Experiments were performed using four HDR video sequences of about 10 seconds ("Market," "Tibul," "FireEater" and "Balloon") which were suggested in the CfE by MPEG as anchor sequences. The four HDR video sequences were compressed employing the anchor pipeline (denoted herein as "anchors") as well as the scaling pipeline disclosed herein. The anchor pipeline uses the PQTF as the EOTF, 4:2:0 chroma downsampling and quantization to 10 bits. Details about the subsampling as well as quantization methods for the anchor pipeline are described in Call for Evidence (CfE) for HDR and WCG Video Coding. Geneva, Switzerland: ISO/IEC JTC1/SC29/WG11, February 2015, doc. N15083 ("the CfE"). To stay close to the anchors, the same EOTF, downsampling and bit depth were used in the scaling pipeline disclosed herein.

Figure 9A:
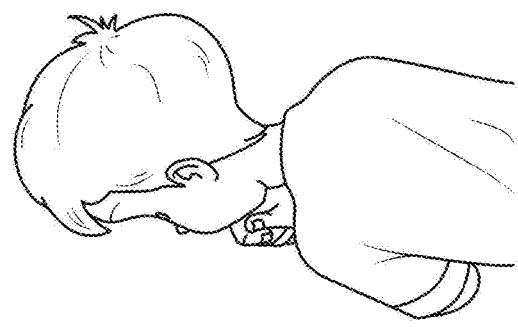
FIG. 9A is a table showing parameters for encoding four video sequences implemented in experiments comparing the scaling pipeline disclosed herein with a conventional pipeline.

Encoding and decoding was done with the reference implementation of the HEVC codec. Each sequence was encoded at four different quality levels. The highest quality level 1 was roughly equivalent to the uncompressed video. The lowest quality level 4 showed strong luminance and color artifacts. Encoding parameters for the anchors and the four target bitrates are given in the CfE and were created by varying the quantization parameter (QP) parameter of the encoder only. In a similar fashion, the scaling pipeline disclosed herein was used to generate results that match the four bitrates of the anchors as closely as possible by only varying the QP parameter of the encoder and the scaling parameter. The QPs were matched closely to the ones used for the anchors to ensure comparable luminance quality. The coding parameters used for the scaling pipeline are shown in the table of FIG. 9A.

The only image metrics actually designed for HDR content use only the luminance of the video to give an assessment of the video quality and neglect the color. As objective quality measurement of color in HDR videos is still an open research question, the experiments relied on subjective studies to evaluate the method disclosed herein. As such, to validate these observations statistically, a user study was conducted for the scaling pipeline disclosed herein. Videos encoded with the scaling pipeline were compared to videos encoded with the MPEG reference coding pipeline as described in the CfE. A double-stimulus forced choice method was employed evaluate the luminance and the color quality.

Figure 9B:
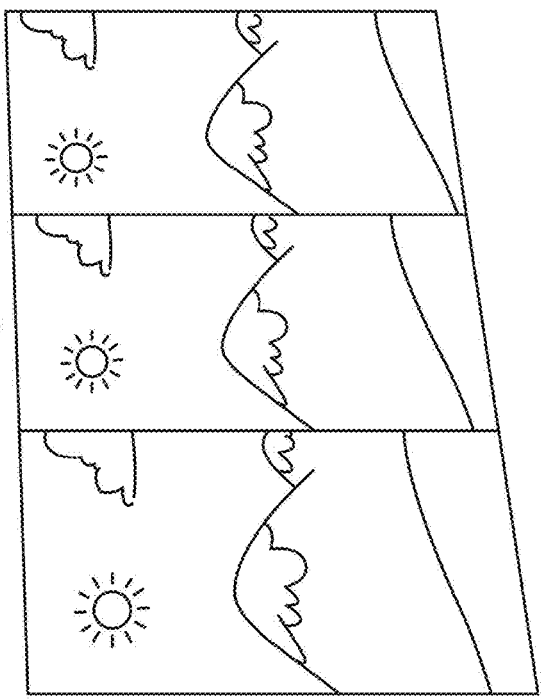
FIG. 9B illustrates an HDR video screen layout for the experiments of FIG. 9. The center part of the screen showed the original, unencoded video. The same video encoded with the conventional/anchor pipeline (A) and the scaling pipeline disclosed herein (P) were shown randomized on the right or left side of the original video.

As only one HDR display was available, the videos were split into 3 parts, illustrated by FIG. 9B. The same part of the original, uncompressed video (O) was shown side-by-side with the anchors (A) and our results (P). The original was always in the middle framed by the other two videos which were ordered randomly. Considering both possible arrangements (AOP and POA), there was a total of 96 different videos (4 videos×4 quality levels×3 parts×2 arrangements).

Fourteen naïve subjects participated in the user study and were placed, one at a time, centered about 1.2 meters away from the screen. The subjects were checked for visual impairments to ensure no colorblindness and corrected full vision. The experiment started with a thorough explanation of the term HDR, followed by an introduction into video quality and luminance as well as color artifacts. Each subject was to judge 50 videos that were randomly selected out of the 96 possible videos and was asked to decide which video, the left or right, exhibited overall better color and which exhibited overall better luminance quality. The 'same' option was added to avoid random preference selection. For the statistical analysis the results of the 'same' option were then evenly split to both methods.

Figure 10:
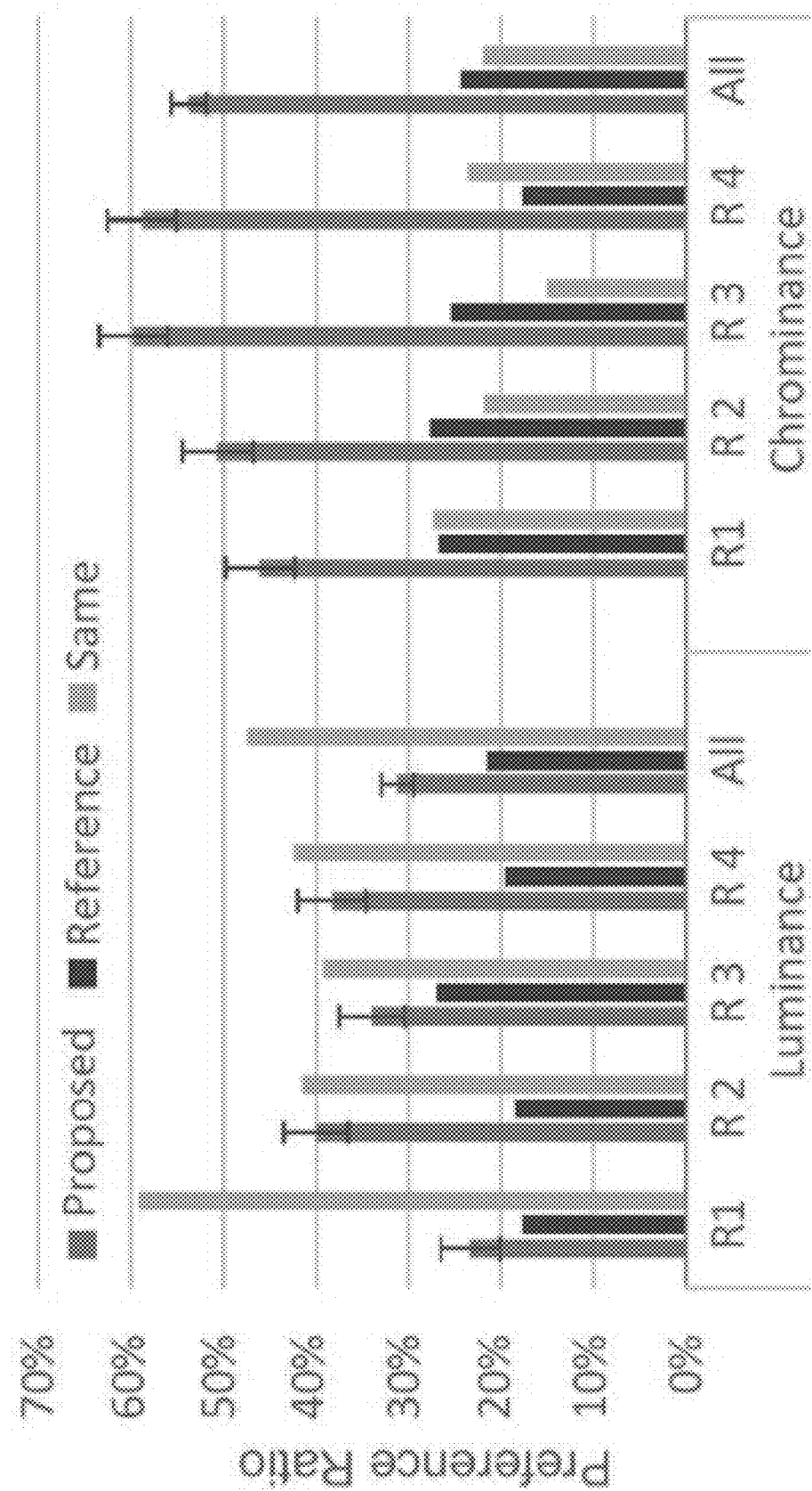
FIG. 10 is a chart showing the overall results of an experiment comparing the scaling pipeline disclosed herein with a reference or conventional pipeline. The x-axes show the different quality levels from 'R 1' for the highest quality (highest bitrate) to 'R 4' for the lowest quality.

The overall results of the experiment are illustrated in FIG. 10. The x-axes show the different quality levels from 'R 1' for the highest quality (highest bitrate) to 'R 4' for the lowest quality. The 'All' column contains all ratings for all quality levels added up. On the y-axes the preference ratio among all subjects, all videos and all parts are shown, i.e., how many percent of the total ratings for videos of a given rate were for the scaling pipeline disclosed herein (left bar), for the reference pipeline (middle bar) or were voted 'Same' (right bar).

For quality levels 3 and 4 the subjects strongly favored the chrominance quality of the scaling pipeline disclosed herein. A z-test showed the results to be statistically significant at the 99% level. The luminance results were not clearly in favor of one of the methods but rather show that the luminance quality of the videos encoded with the scaling pipeline disclosed herein can in general be considered at least as good as the anchor videos. The average results for luminance as well as chrominance reflect the overall trend, i.e., the luminance quality was preserved while the chrominance quality was enhanced for high compression rates.

The detailed results of the user study are listed in the table of FIG. 11, where numbers on the left column for a given quality level or "rate" indicate a preference for the scaling pipeline disclosed herein, and numbers on the right column for a given rate indicate a preference for the anchor pipeline. The results show that for the Tibul sequence there is significant favorability for the scaling pipeline disclosed herein. The quality difference for the Market video becomes apparent with lower bitrates. As also shown, the Balloon sequence ends up slightly more balanced for the scaling pipeline.

As a general observation, the scaling pipeline disclosed herein exhibits considerably less color artifacts as compared to the anchors when stronger compression is applied.

The constant luminance pipeline that includes a geometric transform to chrominance components described in U.S. patent application Ser. No. 14/862,027 was similarly tested. While that pipeline showed experimental results on a similar level as the scaling pipeline disclosed herein, the scaling pipeline disclosed herein is considerably less complex.

Figure 12:
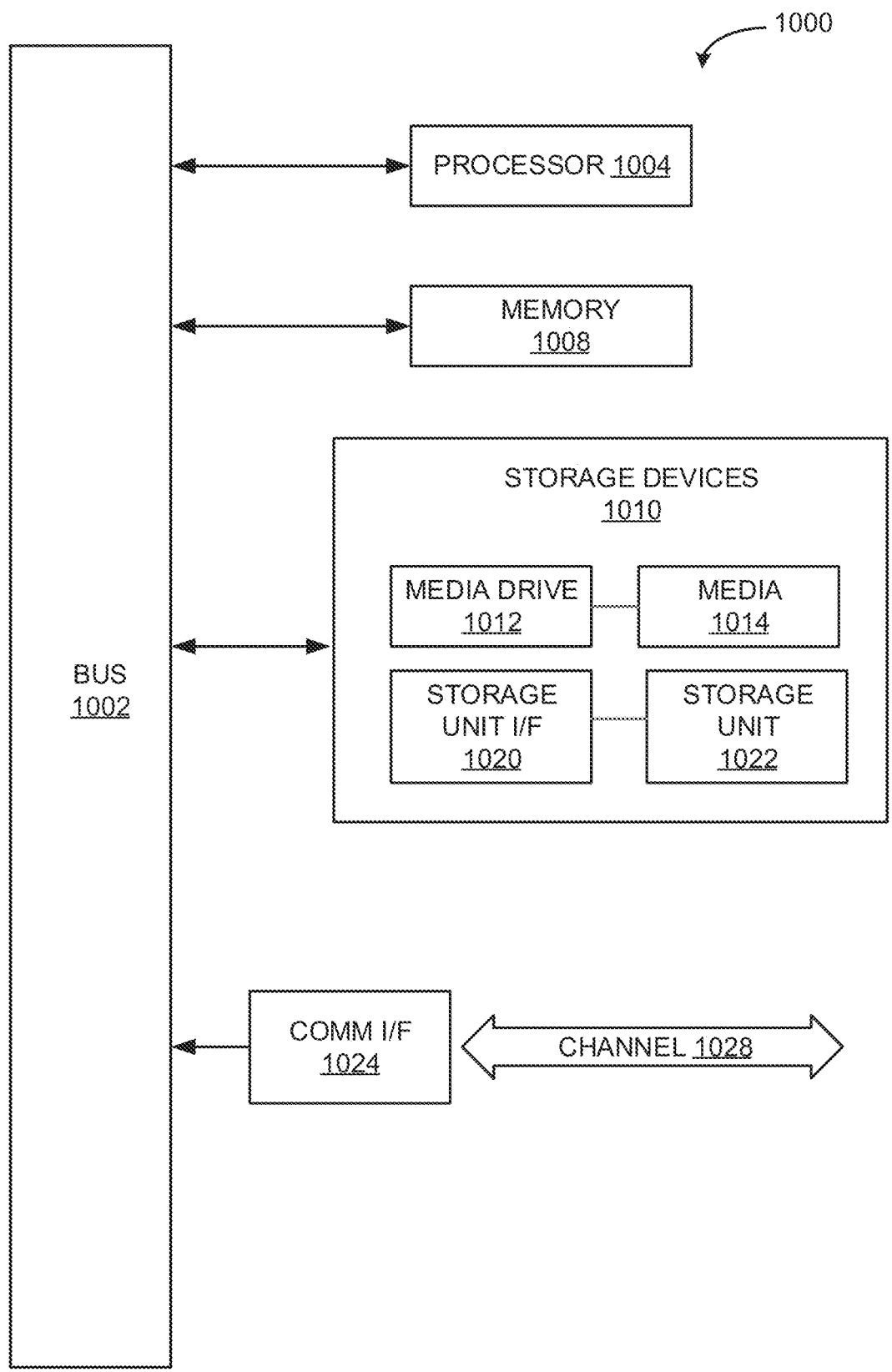
FIG. 12 is an example computing component that may be used to implement various features of embodiments described in the present disclosure.

FIG. 12 illustrates an example computing component that may be used to implement various features of the system and methods disclosed herein, such as the aforementioned features and functionality of one or more aspects of pre-processing and post-processing portions 210 and 250, respectively, of video coding system 200.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 12. Various embodiments are described in terms of this example-computing module 1000. After reading this description, it will become apparent to a person skilled in the relevant art how to implement the application using other computing modules or architectures.

Referring now to FIG. 12, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical disk drive, a CD or DVD drive (R or RW), or other removable or fixed media drive might be provided. Accordingly, storage media 1014 might include, for example, a hard disk, a solid state drive, magnetic tape, cartridge, optical disk, a CD, DVD, or Blu-ray, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1008, storage unit 1022, and media 1014. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment.

Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

What is claimed is:

1. A method, comprising:
receiving an input bitstream carrying an encoded image represented by a uniform color space model;
decoding quantized chrominance and luminance components of the encoded image;
inverse quantizing the quantized chrominance and luminance components to generate a luminance component a set of two or more scaled chrominance components;
inverse scaling a color gamut of the set of two or more scaled chrominance components to generate a set of two or more chrominance components of a first image represented by the uniform color space model; and
converting, based on the luminance component and the set of two or more chrominance components, the first image represented by the uniform color space model into a second image represented by an additive color space model.

2. The method of claim 1, wherein:
the first uniform color space model comprises a Yu'v' color space model;
Y is the luminance component;
u' and v' are included in the set of two or more scaled chrominance components; and
the additive color space model comprises a red-green-blue (RGB) color space model.

3. The method of claim 2, further comprising:
after inverse scaling the color gamut of the set of two or more scaled chrominance components, applying a gamut mapping to the set of two or more chrominance components, wherein one or more out-of-color gamut pixels are mapped into a display gamut.

4. The method of claim 3, wherein applying the gamut mapping comprises:
mapping RGB values smaller than 0 to 0; and
mapping RGB values larger than 1 to 1.

5. The method of claim 3, further comprising:
upsampling the set of two or more chrominance components before inverse quantizing the set of two or more chrominance components.

6. The method of claim 3, further comprising:
applying an inverse electro-optical transfer function to the luminance component after inverse quantizing the luminance component.

7. The method of claim 2, wherein:
the color gamut comprises a visual color gamut; and
inverse scaling the color gamut of the set of two or more scaled chrominance components comprises scaling a rectangular bounding box of the visual color gamut in a parameter space of the u' and v' components.

8. The method of claim 7, wherein the rectangular bounding box is scaled by an inverse of a factor between about 0.4 and about 1.6.

9. The method of claim 2, further comprising:
after converting the first image represented by the uniform color space model into the second image represented by an additive color space model, displaying, on a display, the second image represented by the additive color space model.

10. The method of claim 2, further comprising:
receiving a scaling parameter with the input bitstream, wherein the color gamut of the set of two or more scaled chrominance components are inverse scaled based on the received scaling parameter.

11. One or more non-transitory computer-readable media storing instructions stored thereon that, when executed by one or more processors, cause the one or more processors to perform the steps of:

receiving an input bitstream carrying an encoded image represented by a uniform color space model;
decoding quantized chrominance and luminance components of the encoded image;
inverse quantizing the quantized chrominance and luminance components to generate a luminance component and a set of two or more scaled chrominance components;
inverse scaling a color gamut of the set of two or more scaled chrominance components to generate a set of two or more chrominance components of a first image represented by the uniform color space model;
converting, based on the luminance component and the set of two or more chrominance components, the first image represented by the uniform color space model into a second image represented by an additive color space model.

12. The one or more non-transitory computer readable media of claim 11, wherein:
the uniform color space model comprises a Yu'v' color space model;
Y is the luminance component;
u' and v' are included in the set of two or more scaled chrominance components; and
the additive color space model comprises a red-green-blue (RGB) color space model.

13. The one or more non-transitory computer readable media of claim 12, further comprising instructions that, when executed by the one or more processors, cause the one or more processors to perform the steps of:
after inverse scaling the color gamut of the set of two or more scaled chrominance components, applying a gamut mapping to the set of two or more chrominance components, wherein one or more out-of-color gamut pixels are mapped into a display gamut.

14. The one or more non-transitory computer readable media of claim 13, wherein applying the gamut mapping comprises:
mapping RGB values smaller than 0 to 0; and
mapping RGB values larger than 1 to 1.

15. The one or more non-transitory computer readable media of claim 13, further comprising instructions that, when executed by the one or more processors, cause the one or more processors to perform the steps of:
upsampling the set of two or more chrominance components before inverse quantizing the set of two or more chrominance components.

16. The one or more non-transitory computer readable media of claim 13, further comprising instructions that, when executed by the one or more processors, cause the one or more processors to perform the steps of:
applying an inverse electro-optical transfer function to the luminance component after inverse quantizing the luminance component.

17. The one or more non-transitory computer readable media of claim 12, wherein:
the color gamut comprises a visual color gamut; and
inverse scaling the color gamut of the set of two or more scaled chrominance components comprises scaling a rectangular bounding box of the visual color gamut in a parameter space of the u' and v' components.

18. The one or more non-transitory computer readable media of claim 17, wherein the rectangular bounding box is scaled by an inverse of a factor between about 0.4 and about 1.6.

19. The one or more non-transitory computer readable media of claim 12, further comprising instructions that, when executed by the one or more processors, cause the one or more processors to perform the steps of:
after converting the first image represented by the uniform color space model into the second image represented by an additive color space model, displaying, on a display, the second image represented by the additive color space model.

20. The one or more non-transitory computer readable media of claim 12, further comprising instructions that, when executed by the one or more processors, cause the one or more processors to perform the steps of:
receiving a scaling parameter with the input bitstream, wherein the color gamut of the set of two or more scaled chrominance components are inverse scaled based on the received scaling parameter.

* * * * *

UNITED STATES PATENT AND TRADEMARK OFFICE
CERTIFICATE OF CORRECTION

PATENT NO. : 10,735,628 B2
APPLICATION NO. : 16/552985
DATED : August 4, 2020
INVENTOR(S) : Samir Mahmalat, Tunc Aydin and Aljosa Smolic Page 1 of 1

It is certified that error appears in the above-identified patent and that said Letters Patent is hereby corrected as shown below:

In the Claims

Column 16, Claim 2, Line 19, please delete "first".

Signed and Sealed this
Twentieth Day of October, 2020

Andrei Iancu
*Director of the United States Patent and Trademark Office*